Aug. 9, 1966     L. M. ANDERSEN     3,265,298
CASH REGISTER WITH REMOTE INDICATOR
Filed April 4, 1962     4 Sheets-Sheet 1
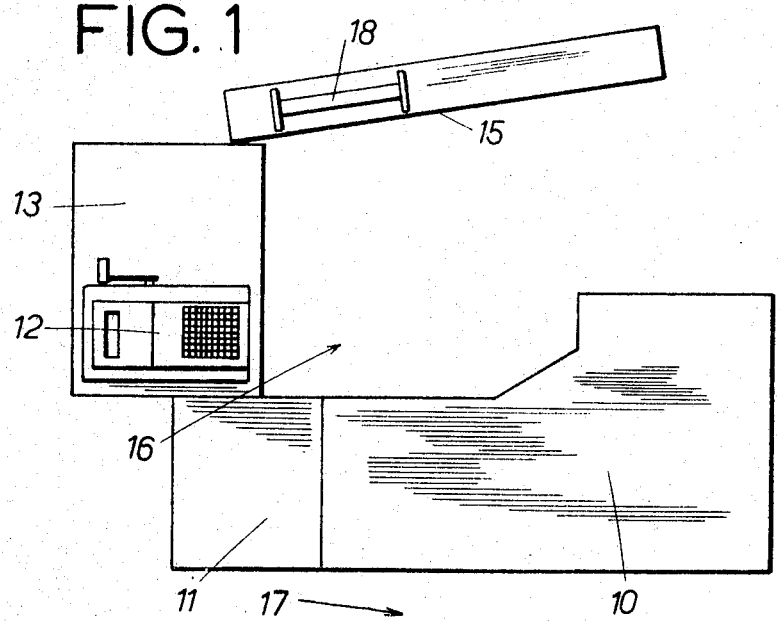
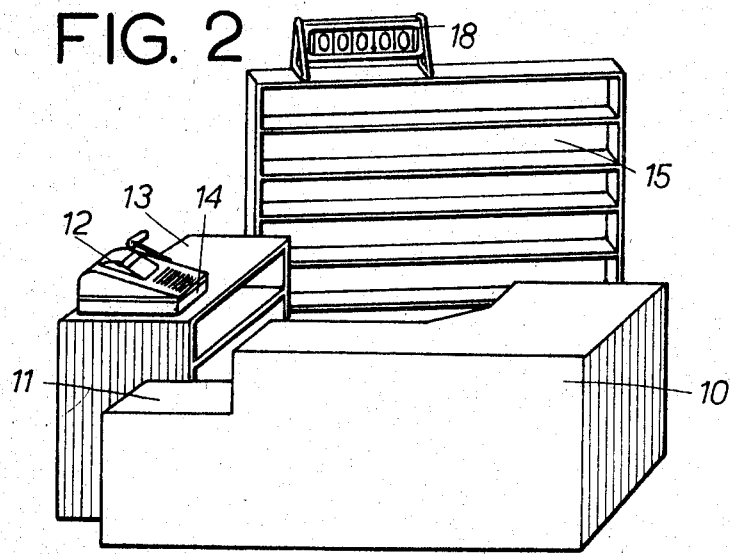

Aug. 9, 1966  L. M. ANDERSEN  3,265,298
CASH REGISTER WITH REMOTE INDICATOR
Filed April 4, 1962  4 Sheets-Sheet 3

United States Patent Office 3,265,298
Patented August 9, 1966

3,265,298
CASH REGISTER WITH REMOTE INDICATOR
Leif Malcolm Andersen, Bergen, Norway, assignor to Jorgen Sigurd Lien, Bergen, Norway
Filed Apr. 4, 1962, Ser. No. 185,124
Claims priority, application Norway, Apr. 6, 1961, 139,745
1 Claim. (Cl. 235—23)

This invention relates to self-service shops and stores, and also to a cash register for use in such self-service shops and stores.

In such self-service shops and stores, one has a cash counter where the customer places the goods which he has collected from the shelves in the store and which he desires to buy. The cashier will then take the goods one by one, counting their price into the cash register and thereupon placing the counted goods at the other end of the counter.

This counting-in of the goods to be bought necessitates transferring the cash register from its conventional position in ordinary shops to one at the side of the cash counter. For easy operation by the cashier, the cash register is most conveniently arranged so that its money drawer moves substantially parallel to the length of the cash counter. This location, however, although being convenient for the cashier, is unfortunate for the customer, as he will not be able to see the amounts counted into the cash register since the normal indicator display will face away from the counter.

It is an object of the invention to avoid this disadvantage and to provide a cash counter arrangement in which the amounts counted into the cash register will be displayed to the customer standing in front of the cash counter.

A further object of the invention is the provision of a cash register which is suitable for use in such cash counters.

With these objects in mind, the invention consists in a cash counter, particularly for self-service shops, comprising a desk for placing the sold goods for adding up, and a table supporting a cash register whose drawer moves parallel to the length of the desk, a characterising feature being that the cash register in addition to its usual indicating mechanism has a number of rows of ten contacts individual to each one of the first digits of the adding machine mechanism, and a corresponding number of movable contacts each associated with an individual one of said rows of contacts and being connected to an individual digit counting mechanism so as to be moved to the contact of the counted number, leads being connected with individual ones of said contacts to individual lamps in an indication panel, which panel is arranged in a direction across the length of the desk.

Further and other objects, advantages and features will become apparent from the following description, in which reference is made to the accompanying drawings, in which:

FIG. 1 is a plan view of a cash counter arrangement in a self-service shop, embodying the present invention.

FIG. 2 is a perspective view of the cash counter arrangement of FIG. 1.

Figure 3:
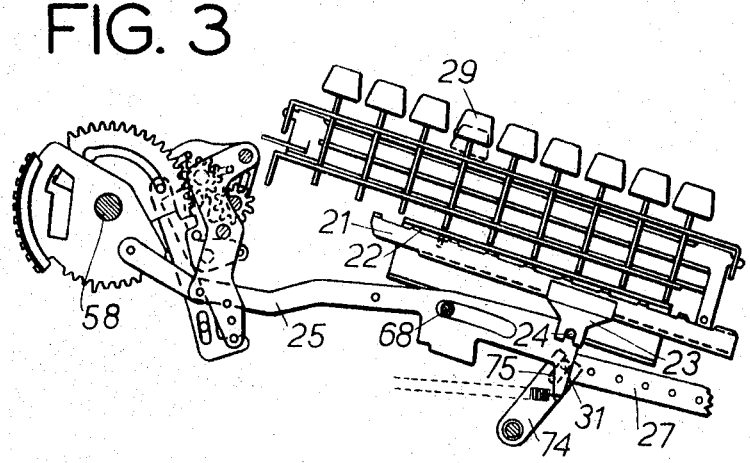
FIG. 3 is a side view of the accounting mechanism in a cash register mechanism.

Referring first of all to FIGURES 1 and 2, the arrangement comprises a desk, generally designated by reference numeral 10, having at one side end thereof, a portion 11 at a level somewhat lower than the level of the main portion of the desk. It is intended that the customer shall place the basket containing the bought goods on this portion 11. A cash register 12 is placed on a table 13 so that the money drawer 14 of the cash register moves substantially parallel to the length of the desk 10. Behind the desk 10 there is normally a shelf arrangement 15 in which small goods such as cigarettes, etc. are stored and displayed.

In normal operation, an employee of the self-service shop is positioned at 16 for counting the goods, placing them one by one on the main portion of the desk while simultaneously counting their price into the cash register. However, in view of the position of the cash register, which is arranged for the convenience of the employee, a customer, who is normally standing at 17, will have difficulty in seeing the amounts counted into the cash register. In this position, the normal indicating mechanism of an ordinary cash register is hidden by the employee.

According to the present invention, it is proposed to arrange a further indicating mechanism 18 on the shelf 15, preferably at the top thereof. By this means, the amounts counted into the cash register will be displayed clearly to the customer. On conclusion of the counting operation, the total amount will be clearly visibly to the customer. In addition to enabling the customer to control the adding operation, purchasing of the goods will be speeded up since the employee no longer has to tell the customer the amount to be paid by him. If desired, he may instead be given other information, for instance about special offers of the week.

In order to provide this additional indication, the cash register has according to another aspect of the present invention been modified. This is explained with reference to FIGURES 3 and 4. For the sake of clarity, only the mechanism for one digit is shown, and also a number of parts which form no part of the present invention have been omitted.

The adding machine of the cash register comprises a frame 20 supporting the different parts of the machine. A key slide member 21 is supported for movement in its longitudinal direction by drive means, not shown, said slide member carrying nine lateral protrusions or lugs 22, corresponding to the numbers 1 to 9 of a digit. In the preferred arrangement, every succeeding lug protrudes to the opposite side of the preceding one.

Further, the slide member has integral therewith a downwardly directed protrusion 23, which has at its free end a slot 24 receiving a stud 24 disposed at one end of an intermediate lever 25. The other end of said lever 25 is linked to a printing sector plate 26. The first mentioned end of the lever 25 has an extension 27, which is received in a slot 28 in the machine frame 20.

Each key slide member 21 cooperates with nine number keys 29, one for each number from 1 to 9 of a digit. The number 0 of each digit is given in a well-known manner, when no key is depressed. Each key carries a downwardly protruding stud 30 forming a stop means for the corresponding lug 22 of the slide member. When the drive means of the adding machine moves the key slide member 21 forwardly, it will move a distance which is proportional to the number to be added into the machine, whereupon its movement is stopped by a corresponding lug 21 engaging the associated stud 30.

As is well-known in the art, a suitable number of such key slide members are arranged in side-by-side relationship in the machine. In order to enable the slide members to move over different distances when driven by the same drive means, the connection between the drive means and the slide members incorporates spring means.

Secured to the extension 27 is a pin 31 engaging the free end of a lever 32 secured at the end of a shaft 33. Secured to the opposite end of said shaft 33 is a corresponding lever 34 carrying at its free end 35 a contact. This contact 35 cooperates with ten stationary electric contacts 36 arranged in a row along a part-circular path, whereby the movable contact 35 may be caused to engage a selected one of said stationary contacts 36 by moving the lever 34 over a corresponding arc. As is easily understood, this movement is synchronized with the movement of the slide member 21 so that the contact 35 engages the stationary contact corresponding to No. 5 when the member 21 moves so far that it is stopped by digit key No. 5.

The stationary contacts 36 are connected with individual ones of a number of electric conduits 37. These conduits are insulated from each other and lead through a common sheathing 38 to an indicator lamp 39. At the back of said lamp the conduits 37 are separated from each other and connected to an individual contact, not shown, which in a manner known per se is connected to a lamp filament, the filament being illuminated as soon as a circuit is closed between a corresponding one of the stationary contacts 36 and the movable contact 35. The movable contact 35 is connected by a separate lead-in to a common terminal forming the end terminal of all of the individual lamp filaments of the indicator lamp 39.

A locking mechanism for the movable contact 35 comprises a lever 40 secured to a shaft 41 and carrying adjacent to its free end a row of recesses 42. Each of the recesses 42 corresponds to an individual one of the stationary contacts 36. A pin 43 on the lever 34 is held in one of said recesses when the lever 34 has been moved so far that its contact 35 engages a desired one of the stationary contacts 36. A tension spring 44 pulls the lever 40 downwardly to ensure that the pin 43 is held in the recess 43.

A cam member of the shaft 41 (not shown) is engaged momentarily when the adding machine starts its counting operation, whereby the shaft is moved so that the lever 40 is lifted to remove the pin 43 from the recesses. A return spring 45 is arranged to pull the lever 34 back into its starting position when this occurs.

It will appear from the preceding description that when a digit key is depressed and the lever 25 is moved forwardly by the drive means of the adding machine, the lever 40 will be lifted for a moment and the lever 35 as mentioned moved back into its starting position. Thereupon, this lever 35 is moved forwardly again by its connection with the lever 25 via the shaft 33, lever 32 and the pin 31. Before the lever 25 has reached its end position, the lever 40 will have been released, whereby one of the recesses will retain the pin 43 to keep the contact 35 in position towards a stationary contact 36 corresponding to the digit number counted into the machine. This will set up a circuit to energize the filament corresponding to said number, whereby said filament will be illuminated to display the corresponding image.

By this means, the digit number counted into the machine will be displayed by a number of lamps assembled to form an additional indicating mechanism, as indicated at 46.

Figure 6:
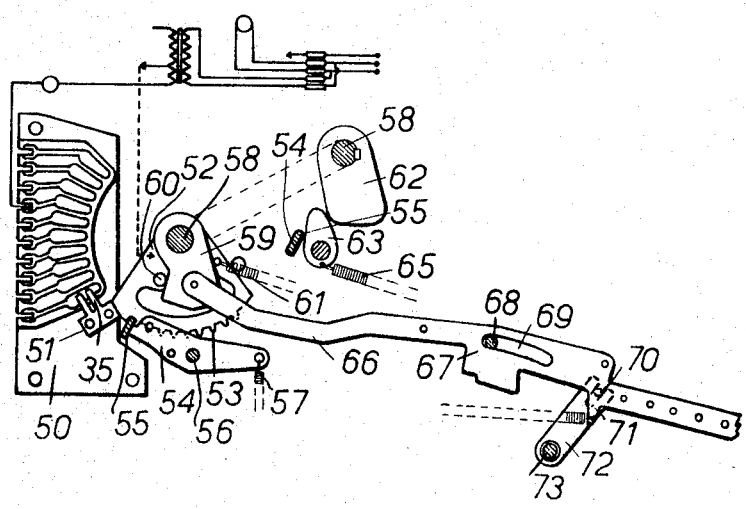
FIG. 6 is a perspective view of a second embodiment of an indicating mechanism for use together with the accounting mechanism of FIG. 3.
Figure 4:
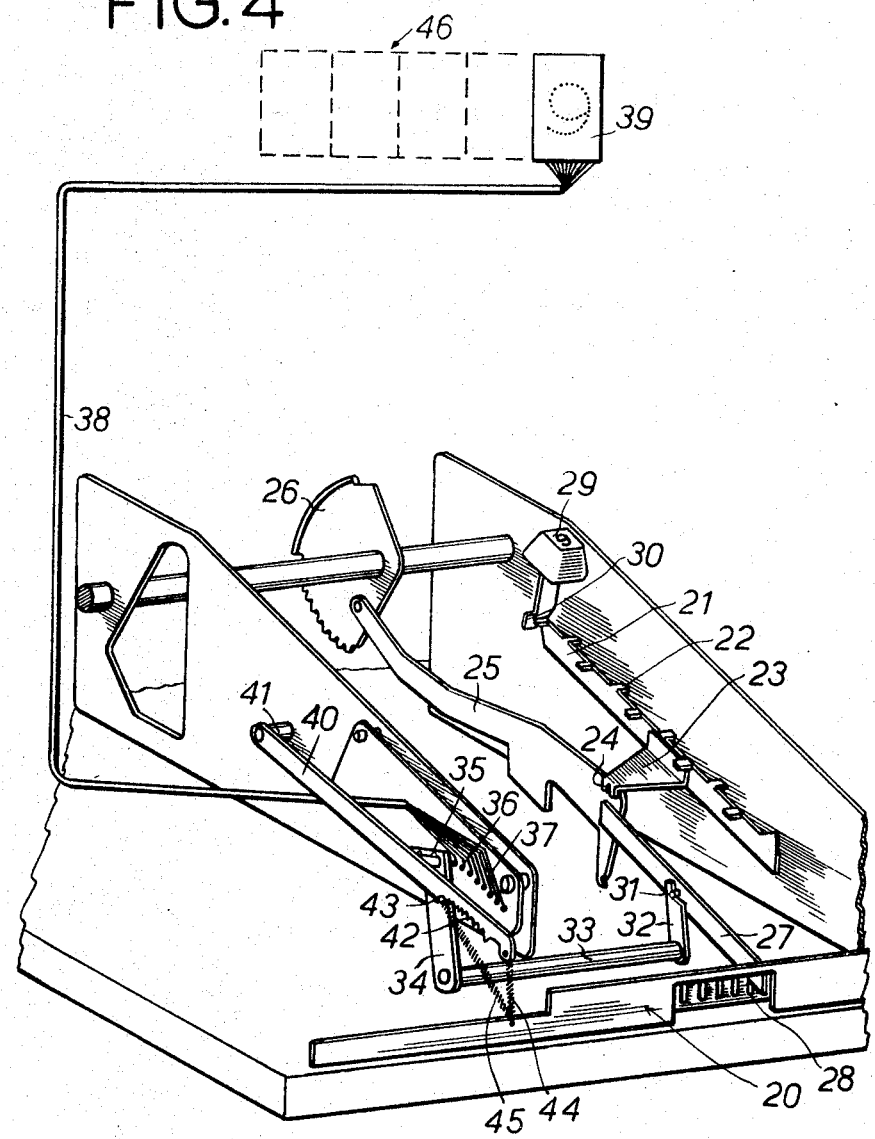
FIG. 4 is a plan view of a first embodiment of a cash register mechanism according to the present invention.
Figure 5:
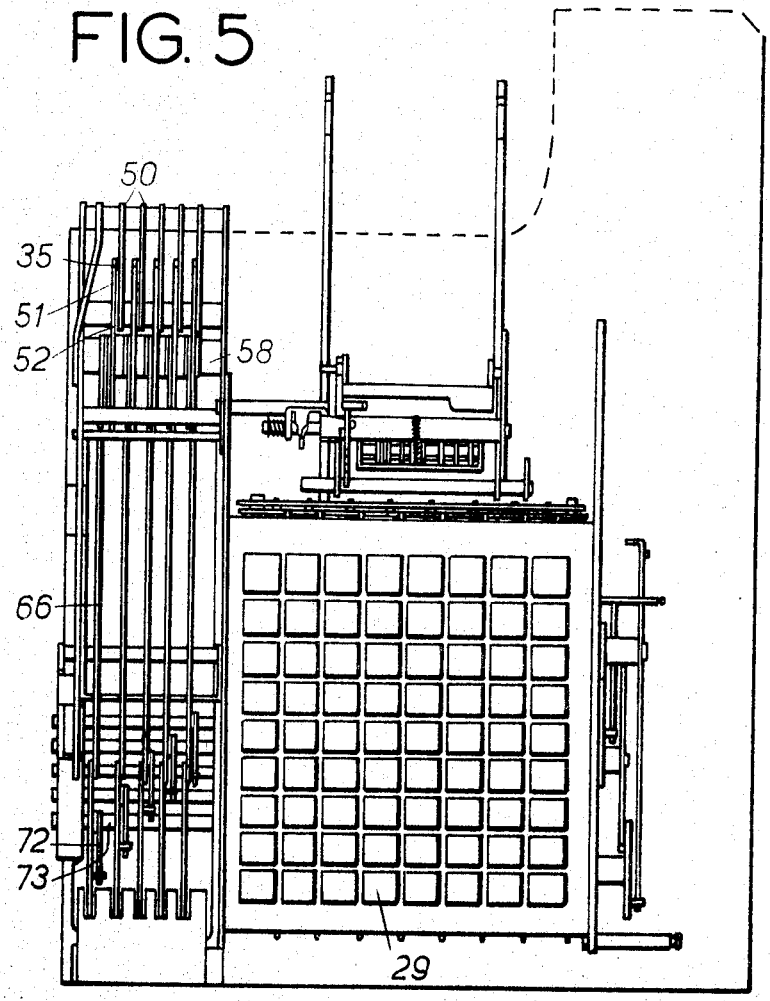
FIG. 5 is a side view of the first embodiment of an indicating mechanism for use together with the accounting mechanism of FIG. 3.

Another embodiment of such mechanism is shown in FIGURES 5 and 6. In this embodiment, similar parts are designated by the same reference numerals as in FIGURES 3 and 4.

In this case, the stationary contacts for each digit are arranged on an individual one of a number of plates 50 of an insulating material. The plates 50 are arranged side by side in spaced relationship at the same end of the machine as the printing sector plates. To facilitate manufacture, the stationary contacts are, as shown in FIG. 6, made as printed circuits manufactured in known manner by printing them upon an insulating sheet. The movable contact 35 is arranged at the end of a protrusion 51 secured to a sector plate 52, which carries a number of teeth 53. A rocking lever 54 carries at one end a locking bar 55 which by engaging between two adjacent teeth 53 may lock the sector plate 52 against movement. This lever 54 is pivotally mounted on a shaft 56, the rocking lever 54 is rocked so as to bring the locking bar 55 out of engagement with the teeth. A spring 57 is arranged to urge the rocking lever 54 towards the teeth.

The sector plate 52 is pivotally mounted on a shaft 58 on which a bellcrank lever plate 59 is also pivotally mounted. A stop pin 60 is arranged on the sector plate 52 against which pin the bellcrank lever plate 59 rests. The sector plate is pulled towards its normal position with the stop pin 60 resting against the bellcrank lever plate 59 by a spring indicated at 61.

The shaft 58 is arranged to be rotated independently of the sector plate 52 and the bellcrank lever plate 59. Secured to this shaft 58 is a cam plate 62 cooperating with a lever 63 which is pivotally mounted on the locking bar 55. A stop 64 limits the movement of this lever in an anticlockwise direction, a small spring 65 being arranged to keep the lever 63 resting against this stop 64.

The shaft 58 will normally be moved over a certain angle in a clockwise direction and then back to its starting position. This shaft corresponds in practice to the shaft 50 referred to in U.S. Patent No. 2,853,233. By this movement, the cam plate 62 will engage the lever 63, depressing this lever and so also the locking bar 55, whereby the sector plate 52 is released by the locking bar being moved away from its engagement between two adjacent teeth. At the end of this movement, the trailing edge of the cam plate 62 will pass the lever 63, whereby the locking bar is released and will snap back into locking position. During the return stroke the lever 63 is rocked in a clockwise direction by the cam plate 62 and the locking bar 55 will not be moved away from its locking position.

During this forward stroke of the shaft 58 and cam plate 62, the sector plate will be moved to the indicating position by a mechanism similar to that of FIG. 4, but somewhat modified. This mechanism is shown in FIG. 6.

A lever 66 is linked at its foremost end to the bellcrank lever plate 59. At 67 this lever is guided by a stationary shaft member 68 forming a part of the machine frame. This shaft member is received within a slot 69 in the lever 66. Adjacent its rear end, the lever 66 carries a pin 70 received within a slot 71 at the end of a bellcrank lever 72 secured to a shaft 73. This shaft, which corresponds to the shaft 33 of the embodiment of FIGURES 3 and 4, also carries another lever 74 which at its free end has a slot 75 receiving the pin 31 of the extension 27.

It will appear from the preceding description that the connection between the bellcrank lever plate and the extension 27 in the embodiment of FIGURES 5 and 6, is a two-way connection, while the corresponding connection in the embodiment of FIG. 4. is a one-way connection.

The arrangement of FIGURES 5 and 6 has the advantage of being easier to manufacture and to install in the machine. Also the locking bar 55 may lock all sector plates in an arrangement comprising five parallel sector plates for five digits, as shown in FIG. 5.

There will now be obvious to those skilled in the art many modifications and variations, utilizing the principles set forth and realizing many or all of the objects and advantages of the arrangement and apparatus described but which do not depart essentially from the spirit of the invention.

What I claim is:

A sales indicating apparatus comprising a cash register and an auxiliary indicating mechanism in operative association with said register and spaced apart therefrom, said register including an indicating, printing and data storing mechanism and an adding machine mechanism, the latter mechanism comprising a plurality of slide members and a corresponding number of digit key rows forming a keyboard, each of said rows of keys cooperating with a corresponding one of the slide members, said slide members each being adapted to be moved a distance which is proportional to the figure on a depressed key of a row of keys, and means for transmitting slide member movement to said indicating, printing and data storing mechanism, said apparatus further including shafts for said slide members, a selected number of the rows of keys each having their respective slide member operatively engaged with a corresponding shaft, first and second levers secured to said shaft, the first lever being connected to its slide member so as to be able to rock a distance proportional to the movement of said slide member, and a movable contact being connected to the second lever which can be moved a distance which is proportional to the movement of the first lever, the auxiliary indicating mechanism comprising lamps, a series of ten stationary contacts, one for each figure in a row of keys, being electrically connected to individual lamps of said mechanism, said movable contact being arranged to cooperate with said stationary contacts and the connection between the slide member and the movable contact being a one-way connection, said movable contact being spring-biased into engagement with said one-way connection, said apparatus further comprising a locking mechanism arranged to lock the movable contact in the position to which it has been moved by its connection with the slide member when the slide member moves back to its starting position, said locking mechanism being released when the slide member starts to move forward.

References Cited by the Examiner

UNITED STATES PATENTS

| | | | |
|---|---|---|---|
| 1,170,480 | 2/1916 | Duffie | 235—23 |
| 1,834,561 | 12/1931 | Watson | 235—58 |
| 1,960,636 | 5/1934 | Knotz | 235—23 |
| 2,438,036 | 3/1948 | Carroll et al. | 235—60 |
| 2,569,711 | 10/1951 | Foster | 186—1.1 |
| 2,955,755 | 10/1960 | Bradshaw | 235—61 |
| 2,961,155 | 11/1960 | Olsen | 235—61 |
| 3,012,719 | 12/1961 | Hohmann | 235—23 |
| 3,028,080 | 4/1962 | Schwend | 235—61.6 |
| 3,033,446 | 5/1962 | Moss | 235—23 |
| 3,088,662 | 5/1963 | Spingies | 235—61 |
| 3,107,051 | 10/1963 | Hoffman | 235—61 |

LOUIS J. CAPOZI, *Primary Examiner.*

KARL J. ALBRECHT, LEO SMILOW, H. C. COE, R. L. PANITCH, *Assistant Examiners.*